Jan. 10, 1928.

H. S. MIRANDETTE

SOLE MOLDING MACHINE

Filed Feb. 3, 1927

1,655,432

INVENTOR-
Hormidas S. Mirandette
By his Attorney,
Nelson M. Howard

Patented Jan. 10, 1928.

1,655,432

UNITED STATES PATENT OFFICE.

HORMIDAS S. MIRANDETTE, OF HAVERHILL, MASSACHUSETTS, ASSIGNOR TO UNITED SHOE MACHINERY CORPORATION, OF PATERSON, NEW JERSEY, A CORPORATION OF NEW JERSEY.

SOLE-MOLDING MACHINE.

Application filed February 3, 1927. Serial No. 165,703.

This invention relates to machines for molding soles, and more particularly to machines for molding turn shoe soles, the invention being herein illustrated in its application to means for molding the toe ends only of the soles.

In the manufacture of turn shoes it is the general practice, before the sole is mounted on the last, to perform thereon a "breaking down" or molding operation whereby its margin outside of the upper-attaching shoulder, i. e., its feather portion, is bent out of the plane of the sole toward the grain side, so as to facilitate the lasting and upper-sewing operations. It is customary to use principally for this bending or molding operation a machine of the progressive type such as shown and described in United States Letters Patent No. 1,110,637, granted on September 15, 1914, upon an application of W. C. Meyer. Since a machine of that type cannot be used with entirely satisfactory results in operating about the toe end of a sole, especially if the sole has a comparatively narrow or pointed toe, it is a frequent practice to mold the toe ends of the soles in a machine of a different type, whereby the entire toe end is molded at a single operation, such a machine being shown and described in United States Letters Patent No. 1,534,052, granted on April 21, 1925, upon an application of F. E. Beckman. Machines of this type comprise a lower or female mold formed with a wall or face oblique to the plane of a sole therein for bending the feather out of said plane toward the grain side of the sole in response to pressure applied on the grain side by an upper or male mold.

Machines of the progressive type above mentioned are so constructed as to perform the molding or bending operation on the margin of the sole without any substantial compression of the sole at the marginal edge; and in the toe-molding machine it is desirable likewise to avoid any substantial compression at the edge of the sole, in order that the edge may not present a different appearance at the toe end than at the rear of the toe. It has accordingly been the practice to form the male mold of the toe-molding machine so that it applies its pressure inside of the extreme marginal edge of the sole. It has nevertheless been found that under some conditions there is still a tendency to compress or distort the marginal edge portion in molding the toe. This tendency is especially evident in operating upon soles which are so rounded and channeled at the forepart that the edge face and the face of the feather on the flesh side form an acute angle, as is customary in the manufacture of some kinds of turn shoes. In molding the toes of soles of that type there has sometimes resulted a compression or distortion at the marginal edge, especially at the apex of the above-mentioned acute angle, which is detrimental to the appearance of the finished shoe.

It is an object of this invention to insure against objectionable results such as above mentioned in the toe-molding operation; and to this end the invention provides, in its illustrative embodiment, a construction in which the female mold has, adjacent to its oblique margin-bending face, in the plane in which the feather of the sole is presented to the machine, a recess insuring ample clearance for the edge of the sole in the molding operation so as to prevent compressing or distorting action of the female mold thereon. In the construction herein shown the mold is formed, as heretofore, with a wall for engaging the edge face of the feather of the sole to determine the lengthwise position of the sole and also to centralize the toe in the mold when the sole is presented to the machine by the operator, the above-mentioned recess being located between the lower end of this wall of the mold and the oblique face and being somewhat narrower, in a direction perpendicular to the plane of the sole, than the width of the edge face of the feather of the sole so as to avoid interfering with the gaging action of said wall upon the sole. Preferably the lower wall of the recess, which extends in a direction parallel to the plane of the sole, projects inwardly toward the center of the mold a little farther than the location of the sole-gaging wall above the recess, so that said lower wall serves to receive and support the outer edge portion of the feather of the sole when the sole is presented to the machine.

The invention will now be more particularly described by reference to the accompanying drawings and pointed out in the claims.

Figure 1:
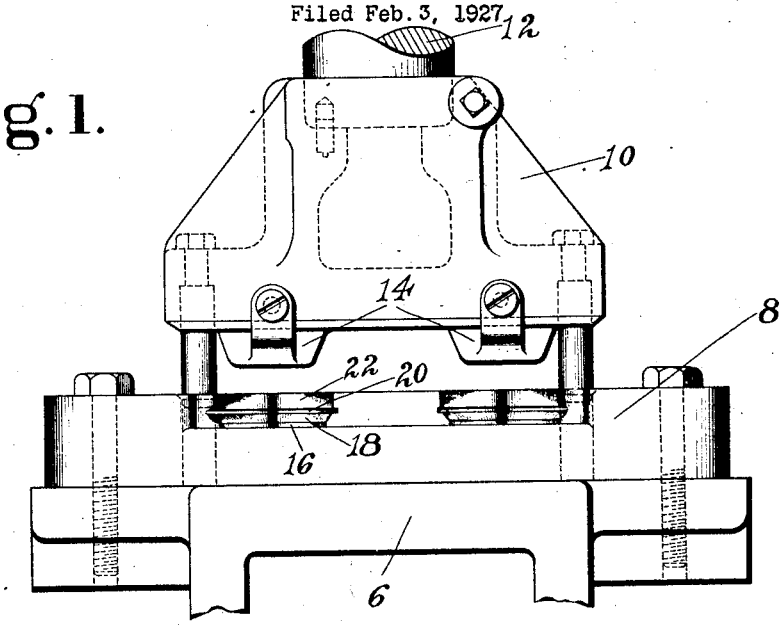
Fig. 1 is a view in front elevation of a portion of a sole toe molding machine of the type shown in the above-mentioned Beckman patent, with the present invention embodied therein.

As more fully described in the Beckman patent, the machine comprises a support 6 upon which is secured a mold block 8 having a pair of female molds formed therein, and vertically movable above the block 8 is a head 10 which is carried by a plunger 12 and has thereon a pair of male molds 14. The two mold couples are identical except for such difference in size or contour as are required for operating upon widely different sizes or styles of soles, and a description of one couple will, therefore, be sufficient for an understanding of the invention.

The female mold is shaped approximately in accordance with the edge contour of the style of sole upon which it is to operate, and has a lower recess to receive that portion of the flesh side of the sole upon which the upper-attaching shoulder $a$ is formed. The side wall 16 of this recess is formed with a sufficiently wide curvature to receive the shouldered portion of the largest sole of the range of sizes upon which it is intended that the same molds shall operate, since it is the practice, for the sake of economy, to use the same molds in operating upon a number of different sizes. Above the wall 16 of this recess is an oblique wall or face 18 which is arranged to engage the margin or feather $b$ of the sole outside of the shoulder $a$ and to bend it out of the plane of the sole toward the grain side in the molding operation. In a plane directly above the oblique wall 18 there is formed, for purposes of this invention, a groove or recess 20 which extends outwardly in the plane in which the feather of the sole is presented to the machine, and above this recess is a vertical wall 22 which is adapted to serve as a gage by contact with the edge face $c$ of the feather of the sole to determine the proper lengthwise position of the sole in the mold and also to assist in centralizing it therein. The lower wall 24 of the recess 20 extends somewhat farther inwardly toward the center of the mold than the location of the wall 22, so that when the sole is presented to the mold the outer edge portion of its feather $b$ will rest upon the wall 24 adjacent to the oblique face 18 in proper position for the beginning of the molding operation. Preferably, as shown, the height of the recess 20 is somewhat less than the width of the edge face of the feather of the sole, so that a portion of the edge face will engage the limiting wall 22 when the margin rests upon the wall 24.

Figure 3:
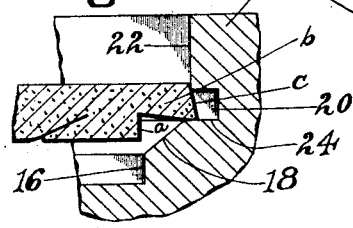
Fig. 3 is a vertical section through the lower mold showing a sole as presented for the molding operation.
Figure 4:
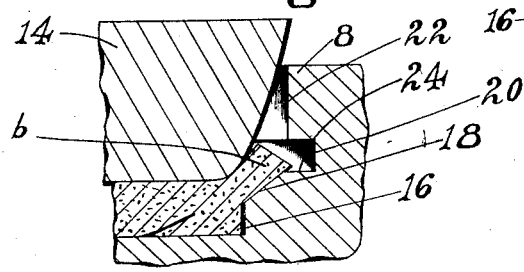
Fig. 4 is a vertical section through the upper and lower molds, illustrating conditions at the end of the molding operation.

Fig. 3 illustrates the position of a sole as presented to the female mold prior to the molding operation. The drawings show a type of sole which is so rounded that its edge face flares outwardly to some extent from the grain side, and which is channeled from its outer edge inwardly by a cut inclined to the plane of the sole, so that the edge face and the face of the feather on the flesh side form an acute angle; and it will be noted that as the sole thus formed is presented in the position illustrated in Fig. 3, the lower edge corner of the feather projects somewhat within the recess 20. The male mold 14 is beveled around its periphery, so that it applies its pressure farther inwardly than the extreme marginal edge of the sole, and in its downward movement it forces that portion of the sole bounded by the shoulder $a$ into the recess within the wall 16 of the lower mold, thereby causing the feather $b$ to be bent upwardly by the action of the face 18, as illustrated in Fig. 4. It will be seen that by reason of the shape of the male mold it thus operates without any compressing action on the marginal edge portion of the feather of the sole. It will be evident that at the beginning of the molding operation the lower edge corner of the feather of the sole, because of the upward inclination of the lower face of the feather from its edge inwardly, tends to spread outwardly as the upward bending of the feather of the sole begins; but the edge is not interfered with in any manner such as to cause compression or distortion by reason of the provision of the recess 20 in the lower mold. It will further be seen that the lower edge corner of the feather which, as above described, rests initially upon the wall 24 of the recess 20, is tipped upwardly away from said wall in the later stages of the molding operation, as illustrated in Fig. 4, which assists further in avoiding any compression or distortion at the edge.

Figure 5:
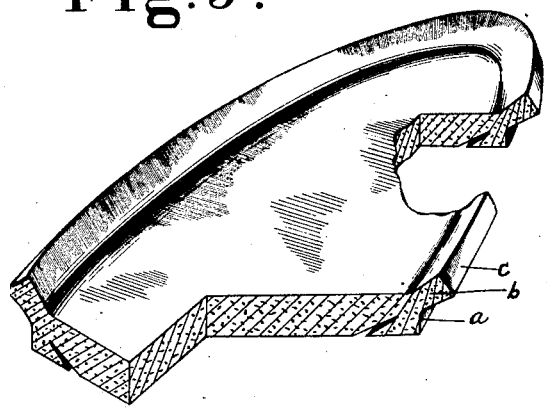
Fig. 5 shows a portion of a sole as it appears after the molding operations have been performed thereon.
Figure 2:
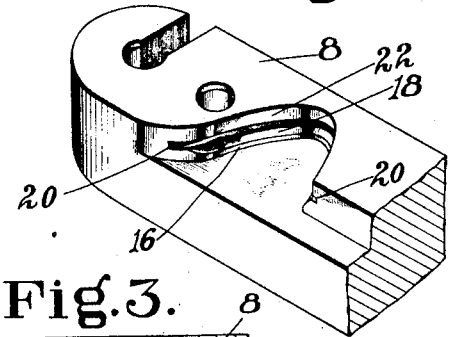
Fig. 2 shows in perspective one of the lower or female molds.

Fig. 5 shows a portion of a sole as it appears after the molding operations have been performed thereon both at the toe end and at the rear of the toe, the sole being sectioned in one location where the toe-molding operation has been performed and in another location where the sole has been operated upon by a machine of the progressive type. It will be seen that the feather of the sole presents a uniform appearance both at the toe end and at the rear of the toe.

Having described the invention, what I claim as new and desire to secure by Letters Patent of the United States is:—

1. In a machine for molding turn shoe soles, a female mold having a face formed to extend in oblique relation to the plane of a sole therein for bending the feather of the sole out of said plane toward the grain side of the sole, and a co-operating male mold formed and arranged to engage the grain side of the sole without substantial compressing action at the marginal edge of the sole, said female mold being recessed adjacent to its oblique face in the plane in which the feather of the sole is presented to the machine to assist in avoiding compression or distortion of the marginal edge of the sole in the molding operation.

2. In a machine for molding the toe ends of turn shoe soles, a female mold formed to receive the toe end of a sole and provided with a face extending in oblique relation to the plane of a sole therein for bending the feather of the sole out of said plane toward the grain side of the sole, and a co-operating male mold formed and arranged to engage the grain side of the sole without substantial compressing action at the marginal edge of the sole, said female mold having above said oblique face a wall arranged for positioning engagement with the edge face of the sole when the sole is presented to the machine and having between the lower end of said wall and its oblique face an outwardly extending recess to assist in avoiding compression or distortion of the marginal edge of the sole in the molding operation.

3. In a machine for molding the toe ends of turn shoe soles, a female mold formed to receive the toe end of a sole and provided with a face extending in oblique relation to the plane of a sole therein for bending the feather of the sole out of said plane toward the grain side of the sole, and a cooperating male mold formed and arranged to engage the grain side of the sole without substantial compression action at the marginal edge of the sole, said female mold having adjacent to its oblique face a wall substantially parallel to the plane of the sole and arranged to support the marginal edge of the feather of the sole prior to the molding operation.

4. In a machine for molding the toe ends of turn shoe soles, a female mold formed to receive the toe end of a sole and provided with a face extending in oblique relation to the plane of a sole therein for bending the feather of the sole out of said plane toward the grain side of the sole, and a co-operating male mold formed and arranged to engage the grain side of the sole without substantial compressing action at the marginal edge of the sole, said female mold having above said oblique face a wall arranged for positioning engagement with the edge face of the sole when the sole is presented to the machine and having between the lower end of said wall and its oblique face an outwardly extending recess the lower wall of which extends farther inwardly toward the center of the mold than the location of said first-mentioned wall to support the marginal edge of the sole prior to the molding operation.

5. In a machine for molding the toe ends of turn shoe soles, a female mold formed to receive the toe end of a sole and provided with a face extending in oblique relation to the plane of a sole therein for bending the feather of the sole out of said plane toward the grain side of the sole, and a co-operating male mold formed and arranged to engage the grain side of the sole without substantial compressing action at the marginal edge of the sole, said female mold having above said oblique face a wall arranged for positioning engagement with the edge face of the sole when the sole is presented to the machine and having between the lower end of said wall and its oblique face an outwardly extending recess to afford clearance for the marginal edge of the sole in the molding operation, the height of said recess being less than the width of the edge face of the feather of the sole.

6. In a machine for molding the toe ends of turn shoe soles, a female mold formed to receive the toe end of a sole and provided with a face extending in oblique relation to the plane of a sole therein for bending the feather of the sole out of said plane toward the grain side of the sole, and a co-operating male mold for engaging the grain side of the sole, said female mold having an outwardly extending recess adjacent to its oblique face to afford clearance for the marginal edge of the sole in the molding operation.

In testimony whereof I have signed my name to this specification.

HORMIDAS S. MIRANDETTE.